United States Patent [19]

Kaufmann

[11] 4,121,702

[45] Oct. 24, 1978

[54] EMERGENCY BRAKE FOR RAIL CARS

[75] Inventor: Karl Ernst Kaufmann, Wetter, Germany

[73] Assignee: Demag, A.G., Duisburg, Germany

[21] Appl. No.: 815,604

[22] Filed: Jul. 14, 1977

[30] Foreign Application Priority Data

Jul. 17, 1976 [DE] Fed. Rep. of Germany ....... 2632244

[51] Int. Cl.² .............................................. B60T 8/16
[52] U.S. Cl. ..................................... 188/187; 188/42; 188/44; 188/167; 188/181 A
[58] Field of Search .................. 188/33, 38, 41, 42, 188/43, 44, 127, 167, 181 R, 181 A, 187, 72.7, 39

[56] References Cited

U.S. PATENT DOCUMENTS

| 709,743 | 9/1902 | Butler | 188/39 |
|---|---|---|---|
| 999,393 | 8/1911 | Moore | 188/42 |
| 2,651,387 | 9/1953 | Genter | 188/33 |
| 2,865,475 | 12/1958 | MacMillin | 188/187 |
| 3,096,854 | 7/1963 | Price et al. | 188/42 |
| 3,415,343 | 12/1968 | Svensson | 188/187 |
| 3,444,964 | 5/1969 | Bartley | 188/39 |
| 3,547,229 | 12/1970 | Pollinger et al. | 188/72.7 |

FOREIGN PATENT DOCUMENTS

| 171,335 | 11/1951 | Austria | 188/187 |
|---|---|---|---|
| 1,028,153 | 4/1958 | Fed. Rep. of Germany | 188/44 |
| 1,605,262 | 11/1972 | Fed. Rep. of Germany | 188/165 |
| 518,738 | 5/1921 | France | 188/43 |
| 1,174,588 | 12/1969 | United Kingdom | 188/44 |

*Primary Examiner*—Edward R. Kazenske
*Attorney, Agent, or Firm*—Mandeville and Schweitzer

[57] ABSTRACT

An emergency brake mechanism is provided, particularly for small railway cars such as those used for monorail systems, for braking a car released by failure of the motor and main braking system. The brake mechanism includes a brake shoe with tapered surfaces extending in opposite directions longitudinally of the path of movement of the car for wedging a brake pad between the shoe and the rail surface. The brake pad is pushed into engagement by a movable tappet, which in turn is released to move toward the rail surface by a centrifugal governor monitoring the speed of the car. The brake housing mounts the brake shoe on one side of the rail with a counter-brake surface on the opposite side.

9 Claims, 4 Drawing Figures

EMERGENCY BRAKE FOR RAIL CARS

BACKGROUND AND STATEMENT OF THE INVENTION

The invention covers an emergency brake for a rail car equipped with a brake shoe which operates in conjunction with a rail brake surface. Emergency brakes of this type are known as magnet rail brakes, as shown in German Patent No. 1,605,262. Magnet rail brakes require substantial controls, which is not felt so much when dealing with large cars, but which, however, causes relatively high costs for small cars.

It is the object of this invention to design suitable emergency brakes for small cars. This is solved by arranging on both sides of the brake tappet, parallel with the rail brake surface, a wedge-shaped brake shoe in such a way that the distance from the brake shoe to the rail brake surface next to the brake tappet is greater than at the outer ends, and that a brake antifriction body is provided between the brake tappet and the rail brake surface. The brake tappet is operated by a centrifugal governor.

When releasing the brake tappet by means of the centrifugal governor, the brake tappet moves the brake antifriction body against the rail brake surface. In accordance with the direction of motion of the rail car, the brake antifriction body rotates and moves between one of the tapered brake shoe extensions and the rail brake surface. If, for example, the rail car becomes defective while going uphill and the engine brake fails, it would then roll back towards the valley until the set value for maximum speed has been exceeded, so that the centrifugal governor frees the brake tappet. The brake antifriction body then rotates on the rail brake surface and moves between the wedge-shaped brake shoe on the uphill side and the rail brake surface.

If the rail car becomes defective while going downhill and the engine brake fails, the centrifugal governor, upon exceeding the limit set for maximum speed, releases the brake tappet which moves the brake antifriction body against the rail brake surface, where it wedges itself between the wedge-shaped brake shoe on the downhill side and the rail brake surface, thus stopping the rail car. The parts of the emergency brake are commercially available and, therefore, inexpensive.

Furthermore, the brake antifriction body is, in released brake position, held by a device coaxially in front of the brake tappet between the brake shoe ends, so that the brake antifriction body does not shift into one of the brake positions inadvertently. Such device consists, preferably, of a lock spring with lock cam protruding into an indentation in the brake antifriction body. The indentation is located on the longitudinal axis of the cylindrical brake antifriction body.

The brake antifriction body may be made of synthetic material or metal. If it is made of synthetic material, it may be provided with a covering of serrated spring steel. A brake antifriction body made of metal may have a covering of synthetic material. The brake antifriction body made of synthetics with a spring steel covering is advantageous, in that it does not clamp as jerkily as a brake antifriction body made of metal, which would lead to a jolting stop of the car and possibly injure passengers. If a brake antifriction body is deformed after a stop, or even destroyed, it may be replaced quickly.

In another feature of the invention, the brake tappet end facing the rail brake surface and adhering to the brake antifriction body may be beveled on both sides so that the brake antifriction body is pushed into operating direction after moving in front of the brake shoes. The brake tappet is charged by a tappet spring in the direction of the brake surface on the rail and adheres with a block at the bolt lever connected to the centrifugal governor and/or speed governor. The latter releases the bolt lever when exceeding the set speed.

The brake shoes are connected to a counterpressure surface arranged on the rail surface opposite the rail brake surface. This counterpressure surface acts as a brake surface as well, and prevents absorption of reaction forces directed laterally by the rail car, such forces occurring during the wedging process of the brake antifriction body. Brake shoes and counterpressure surface are located in a housing in which the brake tappet as well as the lock cam for the brake antifriction body are housed, also. The brake shoes are limited at their extreme ends for the brake antifriction body. The brake surfaces and the counterpressure surface are arranged within the housing displaceable vertically to the rail brake surface, and are held in a central position by guide springs absorbing tension and pressure. The guide springs prevent constant pendulum motion of brake surfaces and counterpressure surfaces within the housing. Together with the guide for brake surfaces and counterpressure surfaces, they facilitate the adjustment of these parts on the rail without the necessity of transmitting the motion to the entire car. Furthermore, the housing forms a simple construction and assembly unit for the emergency brake.

The centrifugal governor and/or speed governor already mentioned is a further feature of the invention, and consists of a disc with several centrifugal weights radially displaceable against the force of springs and, in their extreme position, causing the release of a bolt lever, thus releasing the brake tappet. The disc is connected via a shaft with a wheel running on the rail and is, thus, directly influenced by the running speed.

DETAILED DESCRIPTION OF THE INVENTION

Figure 1:
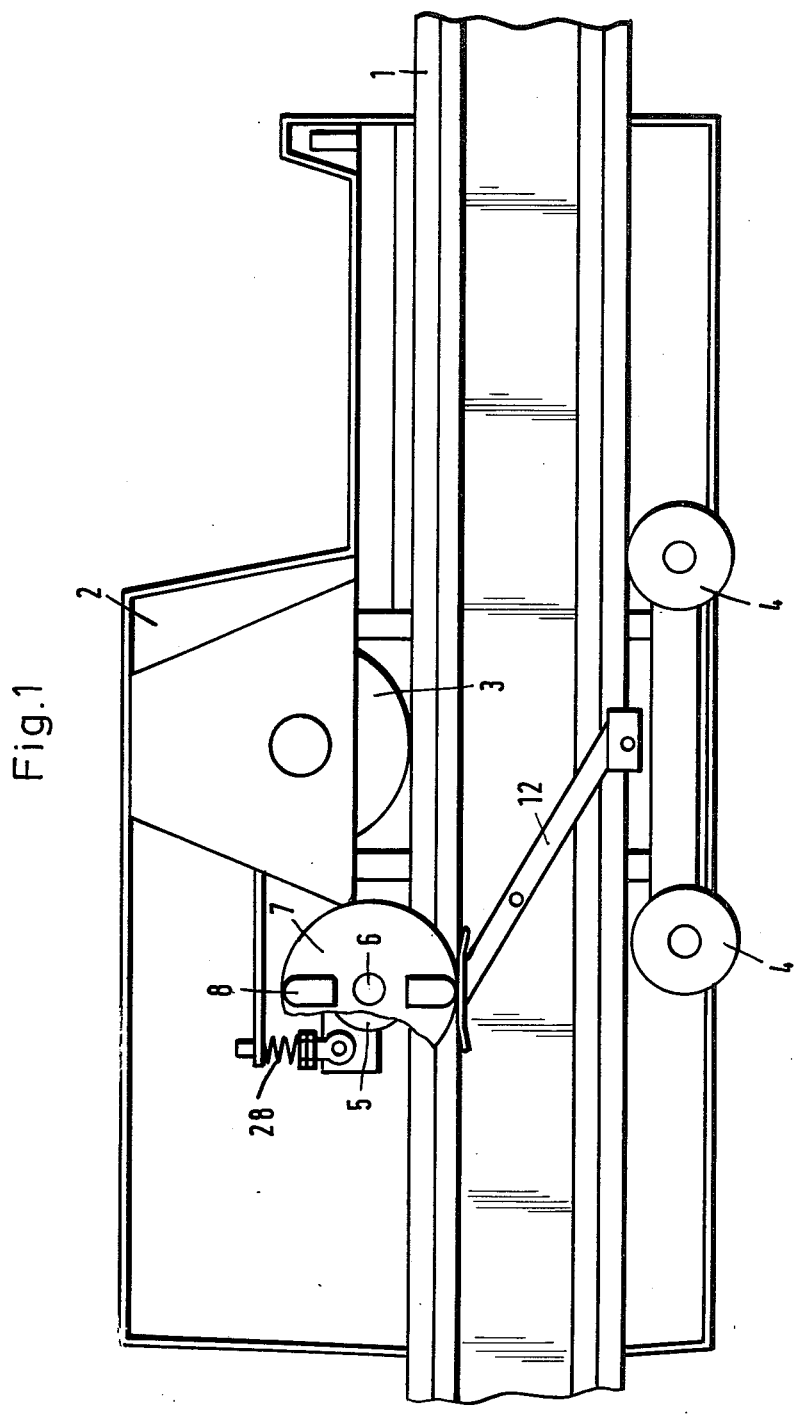
FIG. 1 is a side elevational view of a section of a rail showing a railway car thereon embodying the invention.
Figure 2:
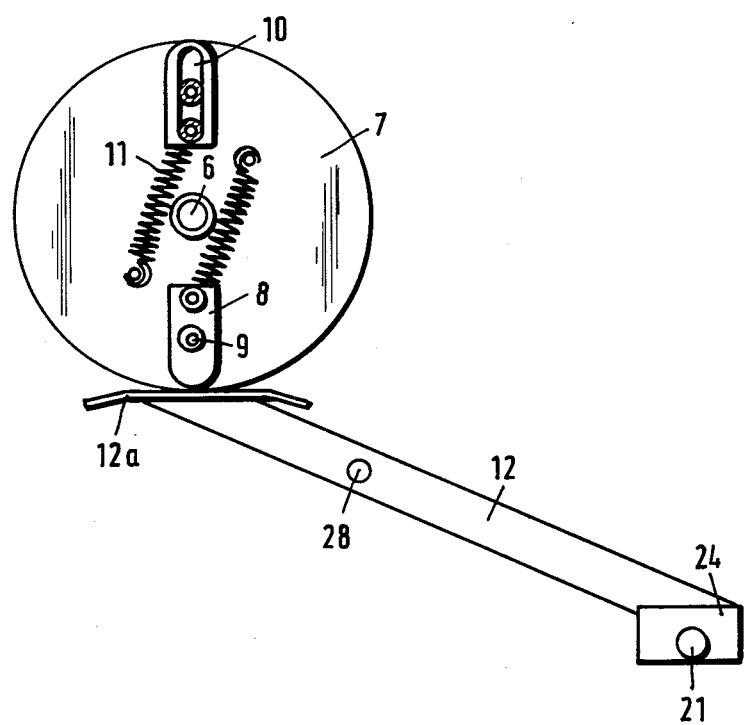
FIG. 2 is an enlarged side elevational view of a portion of FIG. 1, showing details of the centrifugal governor of the invention.

Car 2 runs on driven support wheel 3 on rail 1. Car 2 is equipped below rail 1 with two counterwheels 4, one of which adheres to the rail, depending upon the position of the center of gravity. Car 2 is also furnished with a revolving wheel 5 constantly pressed against rail 1 by means of helical spring 28 and driving, via shaft 6 illustrated in FIG. 3, disc 7 equipped with centrifugal weights 8 by means of pins 9 in slots 10, as may be seen in FIG. 2. Centrifugal weights 8 are pulled by springs 11 towards shaft 6 and when exceeding a nominal number of revolutions, leave the area of disc 7 and push an actuator plate 12a of bolt lever 12, which pivots and frees block 24 of brake tappet 21. Bolt lever 12 pivots on axis 28.

Figure 3:
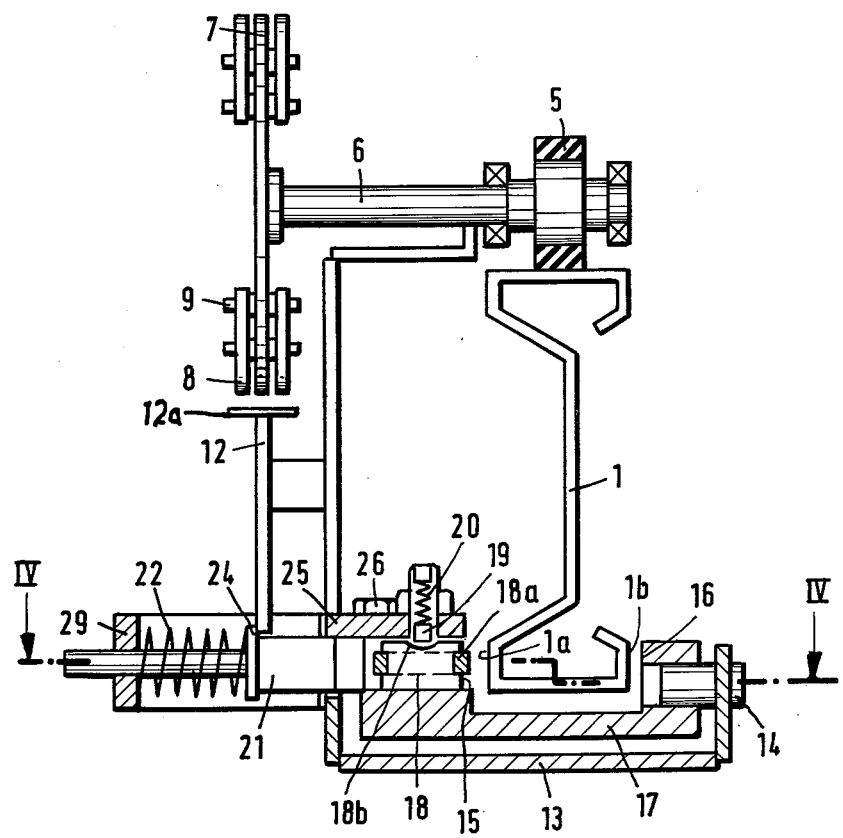
FIG. 3 is a cross section of the emergency brake housing of the invention, showing its relationship to a rail.
Figure 4:
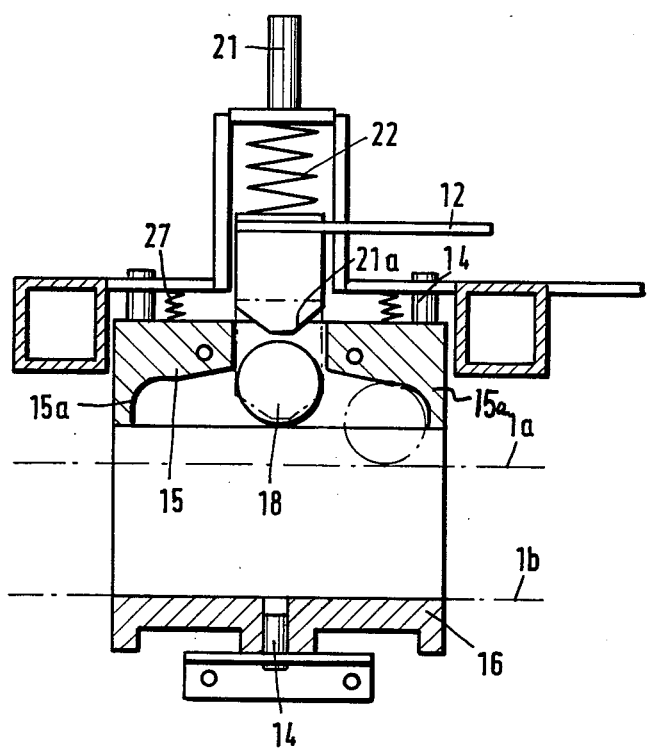
FIG. 4 is a sectional view along lines IV—IV of FIG. 3.

Tappet spring 22, resting on abutment 29, pushes against block 24 of brake tappet 21. Abutment 29 is attached to housing 13 surrounding the lower portion of rail 1 with its rail brake surface 1a and its other rail brake surface 1b, and accommodating wedge-shaped brake shoes 15 shown in FIG. 4 and counterpressure surface 16, which are interconnected via plate 17. Guide bolts 14 shown in FIGS. 3 and 4 are attached to the housing 13 and protrude into brake plates 15 and counterpressure plate 16. Two guide springs 27 rest on housing 13, the former protruding into bore holes of brake shoes 15, thereby maintaining the latter, as well as counterpressure plate 16 in a centered position.

FIG. 4 shows brake antifriction body 18 between brake shoes 15 in front of brake tappet 21, provided with a beveled end 21a in a non-braking position in fully drawn lines. The dot-dash lines show brake tappet 21 advanced by the relaxed tappet spring 22 as well as brake antifriction body 18 in a brake position in front of shoe limit extension 15a. Brake antifriction body 18 adheres to rail brake surface 1a, and counterpressure plate 16 rests on rail surface 1b.

FIG. 3 shows brake antifriction body 18 provided with synthetic ring 18a, with indentation 18b for lock cam 19 affected by lock spring 20. When relaxing tappet spring 22, brake antifriction body 18 is displaced towards the rail, whereby lock cam 19 is pressed out of indentation 18b against the force of lock spring 20. Lock cam 19 with lock spring 20 is arranged in cover 25, which is attached to brake shoes 15 by means of screws 26 in easily removable fashion so that a damaged brake antifriction body can be replaced quickly by a sound antifriction body upon activating the emergency brake.

I claim:

1. An emergency brake for a railway car traveling on a rail, comprising
   (a) a brake housing;
   (b) a brake antifriction body disposed in said housing for engaging the rail;
   (c) a brake shoe disposed in said housing adjacent the rail surface and defining a braking surface; characterized by
   (d) a brake tappet normally held in a retracted position in said housing and mounted for movement toward and away from the rail surface;
   (e) one end of said brake tappet engageable with said brake antifriction body upon movement of said brake tappet toward said rail surface to thereby effect engagement between said antifriction body and said rail surface;
   (f) a centrifugal speed governor associated with the end of said brake tappet opposite said brake antifriction body;
   (g) said governor engaging the rail to monitor the speed of said railway car attached to said brake housing, and operable to allow release of said brake tappet from said retracted position for movement into engagement with said brake antifriction body at a preset speed;
   (h) said brake shoe having extensions with tapered surfaces extending at each end thereof in directions of movement of said railway car attached to said brake housing;
   (i) said tapered surfaces defining a space of gradually decreasing cross section between said braking surface and said rail for wedging said brake antifriction body therebetween upon engagement of said antifriction body and said rail thereby braking said railway car;
   (j) a cam surface in said brake antifriction body;
   (k) a locking detent extending into said cam surface for holding said brake antifriction body in nonbraking position spaced from said rail surface; and
   (l) a lock spring engaging said detent for urging said detent against said cam surface.

2. The device of claim 1, further characterized by
   (a) said brake antifriction body is cylindrical; and
   (b) said cam surface is in the longitudinal axis of said brake antifriction body.

3. The device of claim 1, further characterized by
   (a) the end of said brake tappet engaging said brake antifriction body is beveled.

4. The device of claim 1, further characterized by
   (a) a pivotal lever extending between said governor and said brake tappet;
   (b) a spring for biasing said brake tappet in a direction toward the rail surface; and
   (c) a locking abutment on said brake tappet engaged by one end of said lever; whereby
   (d) pivoting of said lever by said governor moves said lever away from said abutment causing said brake tappet to move toward the rail under the action of said spring.

5. The device of claim 4, further characterized by said speed governor comprising
   (a) a disc;
   (b) a plurality of circumferentially spaced radially movable centrifugal weights on said disc; and
   (c) means for biasing said weights toward the axis of said disc;
   (d) said weights engaging and pivoting said lever in their radially extended position.

6. The device of claim 5, further characterized by
   (a) a wheel running on the rail;
   (b) said wheel non-rotatably disposed on one end of a shaft; and
   (c) said disc non-rotatably disposed on the opposite end of said shaft.

7. The device of claim 1, further characterized by
   (a) a brake counterpressure surface on said housing for engaging said rail on the side thereof opposite said brake shoe.

8. The device of claim 7, further characterized by
   (a) the said brake tappet and the said brake counterpressure surface are vertically displaceable.

9. The device of claim 7, further characterized by
   (a) resilient means disposed between said housing and said brake shoe surface and counterpressure surface for maintaining said rail centered therebetween.

* * * * *